United States Patent [19]

Morris et al.

[11] Patent Number: 4,796,154

[45] Date of Patent: Jan. 3, 1989

[54] MOLDED CASE CIRCUIT BREAKER WITH CONTACT STATUS INDICATING HANDLE

[75] Inventors: Robert A. Morris, Burlington; Irenaeus S. Panus, New Britain; Roger N. Castonguay, Terryville, all of Conn.

[73] Assignee: General Electric Company, Plainville, Conn.

[21] Appl. No.: 60,576

[22] Filed: Jun. 11, 1987

[51] Int. Cl.⁴ .................................... H02B 1/08

[52] U.S. Cl. .................................... 361/353; 74/526; 200/309; 361/363; 361/376

[58] Field of Search .................... 74/526, 566; 335/17; 200/50 A, 50 C, 308, 309, 339, 315, 316, 318, 43.14, 43.15, 153 G, 153 H, 153 V; 337/79; 361/353-354, 363, 376

[56] References Cited

U.S. PATENT DOCUMENTS

| | | | |
|---|---|---|---|
| 2,096,547 | 9/1937 | Jackson | 337/79 |
| 3,596,218 | 7/1971 | Layton | 200/308 |
| 4,527,027 | 7/1985 | Link et al. | 361/376 |
| 4,589,052 | 5/1986 | Dougherty | 361/94 |
| 4,644,122 | 2/1987 | Farley et al. | 208/308 |

*Primary Examiner*—A. D. Pellinen

*Assistant Examiner*—Gregory D. Thompson

[57] ABSTRACT

An integrated electronic trip molded case circuit breaker includes a trip unit circuit arranged on a printed wire board contained within the breaker enclosure along with at least one circuit breaker auxiliary accessory. The condition of the integrated circuit breaker contacts is visually ascertained by a color-coded operating handle skirt subjacent indicating windows on the cover of the circuit breaker enclosure. To deter the egress of ionized gas during overload current conditions through the circuit breaker, the handle skirt seals the operating handle opening from the external environment. A groove formed within the external portion of the operating handle cooperates with an edge surface of the enclosure cover to allow the operating handle to rotate between its fully "OFF" and "ON" positions.

8 Claims, 4 Drawing Sheets

MOLDED CASE CIRCUIT BREAKER WITH CONTACT STATUS INDICATING HANDLE

BACKGROUND OF THE INVENTION

U.S. Pat. No. 4,589,052 entitled "Digital $I^2T$ Pickup, Time Bands and Timing Control Circuits for Static Trip Circuit Breakers" in the name of John J. Dougherty discloses a circuit breaker trip unit which is completely contained within a single integrated circuit chip. The chip, in turn, is mounted on a printed wire board to facilitate connection with the remaining circuit breaker components. This patent is incorporated herein for purposes of reference.

An integrated electronic trip molded case circuit breaker which includes an electronic trip unit as well as at least one circuit breaker accessory unit within a common housing is described within U.S. patent application Ser. No. 045,645 entitled "Rating Plug Enclosure for Molded Case Circuit Breakers". This Application is incorporated herein for purposes of reference.

When the printed wire board containing the trip unit circuit is arranged within the circuit breaker enclosure, an internal barrier integrally formed within the circuit breaker interior, insures that the gaseous by-products generated during contact separation under overload current conditions do not contaminate the sensitive electronic circuit components. The positioning of the internal barrier and printed wire board in the vicinity of the circuit breaker operating handle, requires the operating handle interior components to be reduced in size in order to provide adequate space for the printed wire board and the internal barrier.

One purpose of the instant invention is to provide an operating handle arrangement which allows the operating handle to be moved between its "ON" and "OFF" positions without interfering with the trip unit printed wire board or the internal barrier. A further purpose of this invention is to provide external indication of the condition of the circuit breaker contacts.

SUMMARY OF THE INVENTION

An operating handle for molded case circuit breakers includes a radial groove formed at the junction between the external operating handle post and the interior operating handle flange for cooperating with an edge of the operating handle access slot to allow the operating handle to move between its "ON" and "OFF" positions. The circuit breaker operating handle flange, situated within the circuit breaker enclosure, includes colored indicia visible through windows formed in the circuit breaker cover to illustrate the conditions of the circuit breaker contacts.

DESCRIPTION OF THE PREFERRED EMBODIMENT

Figure 1:
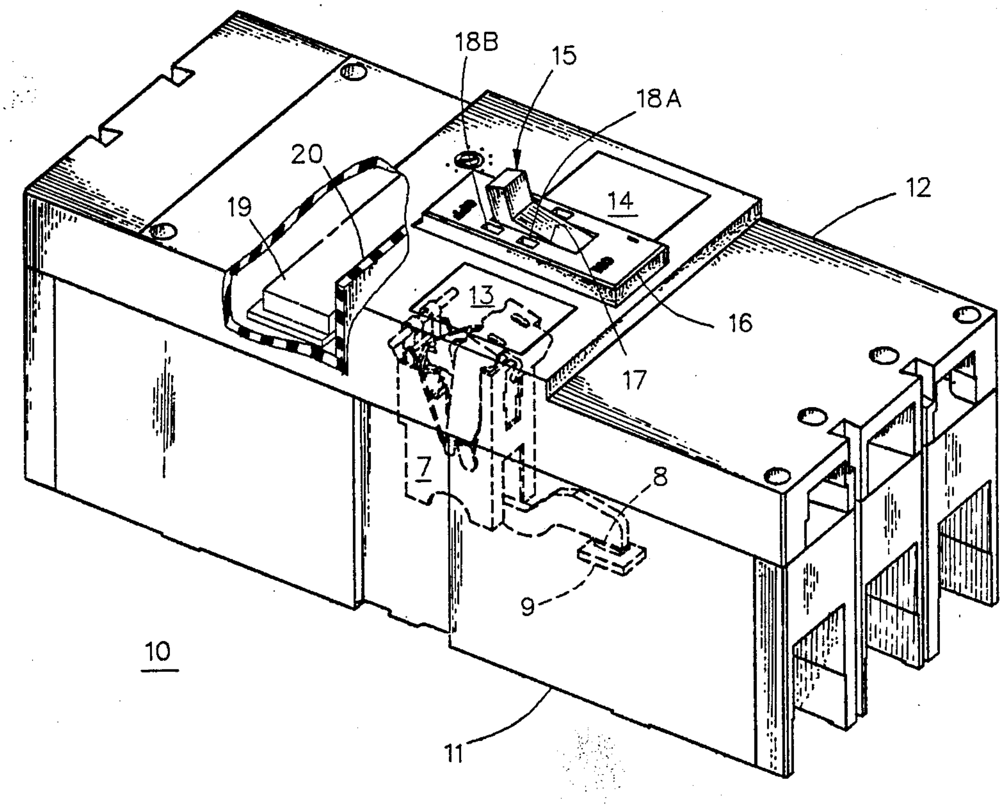
FIG. 1 is a top view showing the circuit breaker case attached to the circuit breaker cover.

An integrated circuit breaker 10 is shown in FIG. 1 wherein the circuit breaker case 11 is attached to the circuit breaker cover 12. A pair of accessory doors 13, 14 formed within the top surface of the circuit breaker cover, one on either side of the escutcheon 16, allows access to the circuit breaker accessory units contained within the interior of the cover. An operating handle 15 extends through an elongated slot 17 formed within the escutcheon to move the circuit breaker contacts 8, 9 contained within the breaker, between its open and closed positions. The status of the circuit breaker contacts is visually ascertained through indicating windows 18A, 18B formed within a top surface of the escutcheon on either side of the operating handle slot 17. The electronic trip unit circuit such as described within the earlier referenced patent to John J. Dougherty, is contained within the printed wiring board 19 mounted within the circuit breaker interior, as indicated. An interior wall 20 is integrally formed within the circuit breaker cover and extends across the circuit breaker interior to protect the electronic components on the printed wire board 19.

Figure 2:
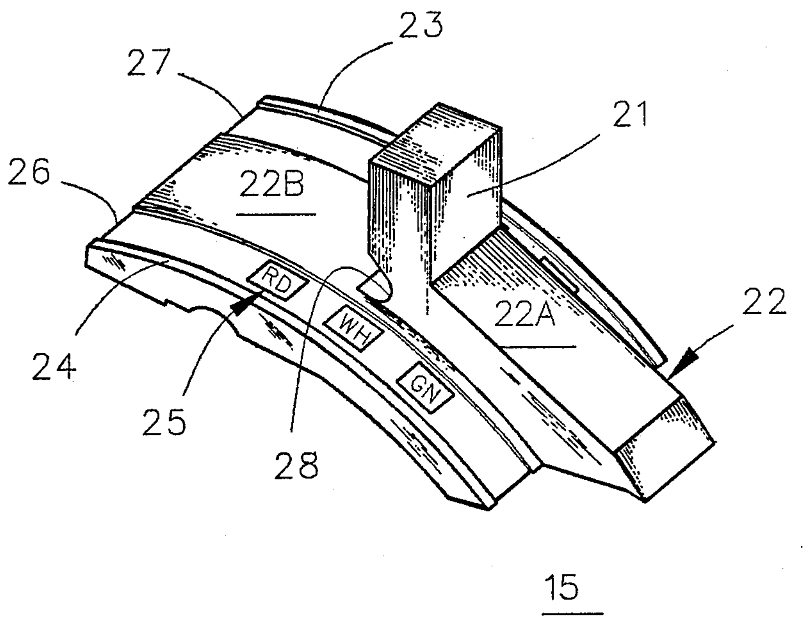
FIG. 2 is a top view of the operating handle.

The operating handle 15 has the configuration depicted in FIG. 2 wherein an upright post 21 extends from and is integrally formed with a central flange 22. The post 21 allows access to the circuit breaker operating handle while the central flange 22 is situated within the circuit breaker interior for interconnection with the circuit breaker operating mechanism contained within the circuit breaker enclosure. A forward part 22A of the central flange 22 extends from one side of the upright post 21, while a rearward part 22B extends from the opposite side thereof. The central flange interacts with the operating mechanism generally depicted at 7 (FIG. 1) to move the contacts between their "ON" and "OFF" position. A transverse radial groove 28 is formed within the upright post 21 at the junction between the upright post 21 and the central flange 22. The purpose of the radial groove will be described below in greater detail. A pair of outer flanges 23, 24 are integrally molded within the operating handle and carry printed indicia, which comprise red, white and green patches 25. The printed indicia are applied within a pair of elongated recesses 26, 27 formed within the top surface of both outer flanges. The provision of the colored patches 25 within the elongated recess allows the operating handle 15 to be moved over a relatively wide range of operating positions without rubbing or otherwise interfering with the paints used to form the colored patches.

Figure 3A:
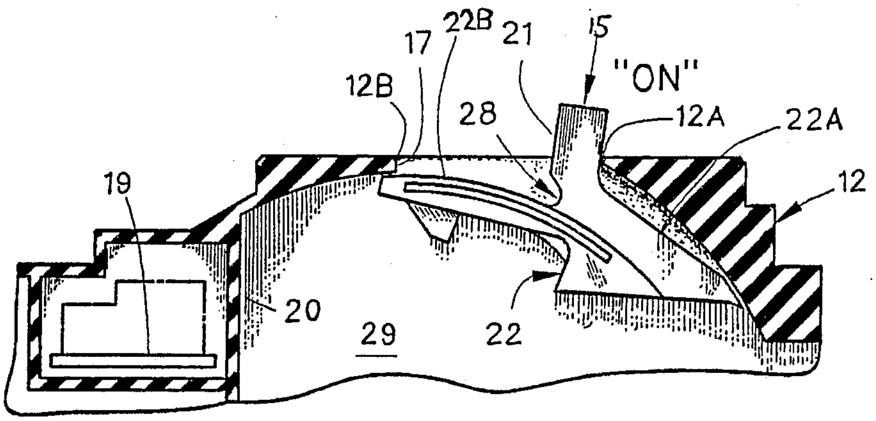
FIGS. 3A, 3B and 3C are views of the operating handle in the different positions to show the condition of the circuit breaker.
Figure 3B:
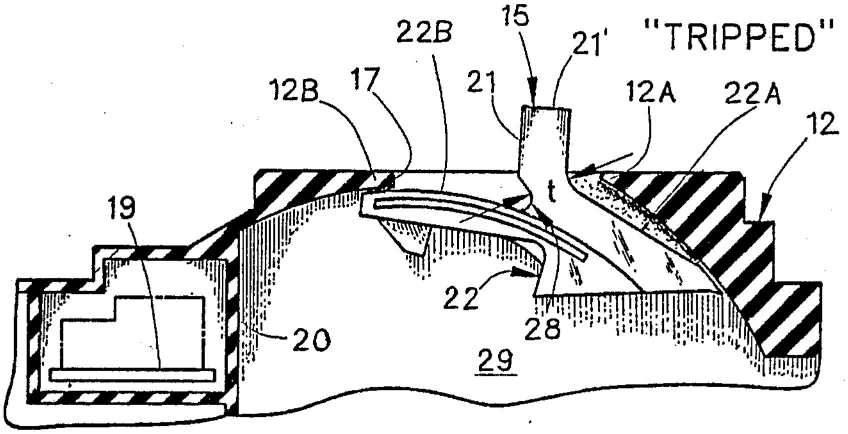
Figure 3C:
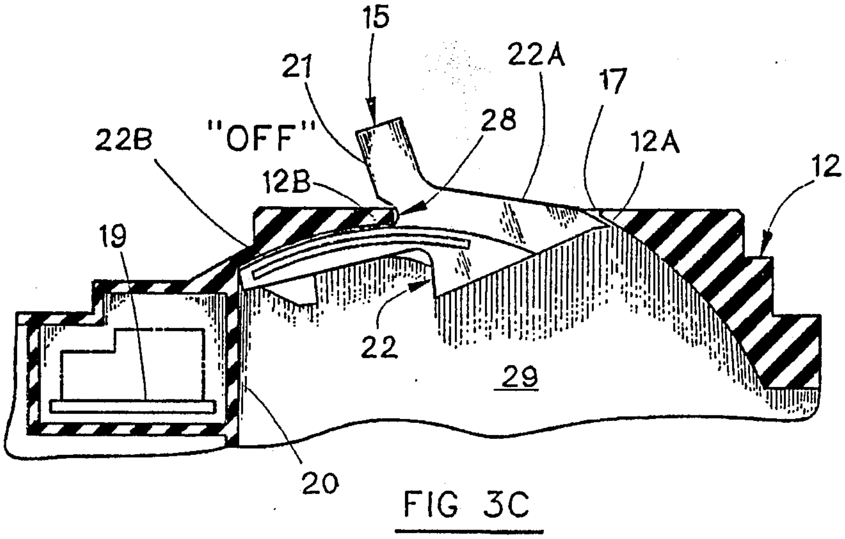

The manner in which the operating handle 15 seals the circuit breaker interior 29 is seen by referring now to FIGS. 3A–3C. When the upright post 21 having the transverse radial groove 28 is in the circuit breaker "ON" position, most of the forward part 22A of the central flange 22 nests under the ledge 12A formed within the circuit breaker cover 12. A small part of the rearward part 22B nests under the ledge 12B formed within the circuit breaker cover at the opposite edge of the elongated operating handle slot 17. In this position the exterior of the cover above the operating handle slot 17 is shielded by means of the central flange 22. In the same manner, the interior components of the circuit breaker are protected against intentional or inadvertent contact. The printed wire board 19 is protected from the circuit breaker interior 29 by means of the interior wall 20 which is integrally formed with the circuit breaker cover. The operating mechanism, fully described in the referenced U.S. Patent Application, is omitted for purposes of clarity.

The operating handle 15 is depicted in its "TRIPPED" position in FIG. 3B wherein the central flange 22 is moved toward the center of the operating handle slot 17, with less of the forward part 22A under ledge 12A and more of the rearward part 22B under ledge 12B. It is noted that the region above the operating handle slot 17, is again completely sealed by the central flange 22. The "OFF" position of the operating handle 15 is depicted in FIG. 3C with less of the forward part 22A of the central flange 22 under ledge 12A and most of the rearward part 22B under ledge 12B and extending up to the interior wall 20. The radial groove 28 formed at the junction of the upright post 21 and the central flange 22 encompasses an edge of the ledge 12B to allow the operating handle 15 to travel to its fully "OFF" or "RESET" position. The provision of the radial groove 28 is an important feature of this invention since the post 21 would not otherwise allow the operating handle 15 to move between its "ON" and "OFF" positions without interfering with ledge 12B of slot 17. To maintain the handle strength, the thickness t of the upright post 21 is uniform from the juncture with the central flange 22 up to the opposite end 21' as indicated in FIG. 3B. The space requirements of the interior 29 prevents the handle slot 17 from being large enough to accommodate a standard industrial circuit breaker handle configuration. The strength requirements of the operating handle 15 prevent an operating handle of lesser thickness than that of a standard industrial circuit breaker operating handle which is approximately equivalent to the thickness t of the operating handle 15 of the instant invention. Thus, the radial groove 28 allows an operating handle 15 of sufficient strength to move between its fully "OFF" and "ON" positions without enlarging the handle slot 17 or decreasing the thickness of the upright post 15.

Figure 4A:
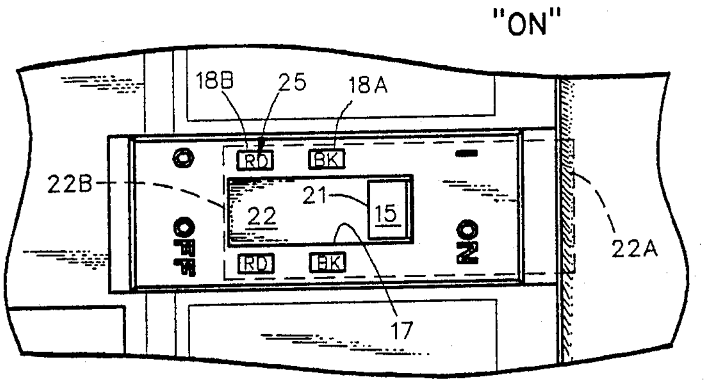
FIGS. 4A, 4B and 4C are top views of the operating handle in different positions with indicating elements to show the condition of the circuit breaker.
Figure 4B:
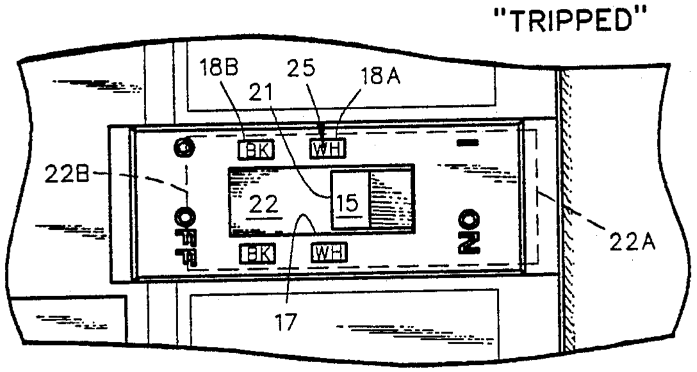
Figure 4C:
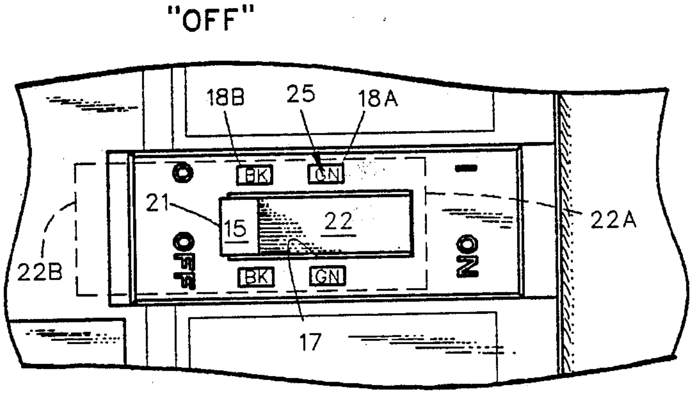

The condition of the circuit breaker contacts is determined by the indicating windows 18A, 18B formed on either side of the operating handle slot 17, as best seen in FIGS. 4A-4C. The "ON" position of the circuit breaker contacts is achieved by positioning the upright post 21 to the right-most corner of the operating handle slot which locates the forward part 22A and rear part 22B of the central flange 22 at the positions shown in FIG. 4A. In accordance with certain International requirements, the patches 25 are designated as follows. A red color (RD) indicates that the circuit breaker contacts are closed; white (WH) indicates that the circuit breaker contacts have tripped and green (GN) indicates that the circuit breaker contacts are open. In the "ON" configuration of FIG. 4A, the red-colored patch 25 is positioned under the second pair of opposing indicating windows 18B, while the uncolored portion of the central flange 22 appears under the first pair of indicating windows 18A. When the entire operating handle 15 is cast from a black colored plastic resin, the black color (BK) appears under the first pair of opposing indicating windows 18A. When the upright post 21 is in the "TRIPPED" position shown in FIG. 4B, the forward part 22A of the central flange 22 moves to the left of the "ON" position and the white patch 25 becomes positioned under the first pair of indicating windows 18A, while the uncolored portion of the central flange appears under the second pair of indicating windows 18B, resulting in the occurrence of a black color. In the "OFF" condition of the circuit breaker contacts shown in FIG. 4C, the upright post 21 is at the left-most part of the operating handle slot 17. The rearward part 22B of the central flange 22 is at the left-most position such that the green colored patch 25 appears under the first pair of indicating windows 18A while the uncolored portion of the central flange 22 is under the second pair of indicating windows resulting in a black color. For some domestic applications a different color code may be used to designate the "OPEN", "TRIPPED" and "CLOSED" conditions of the circuit breaker contacts.

An integrated circuit breaker of the type containing an electronic trip unit and at least one circuit breaker accessory within a common enclosure has been described herein. In order to protect the electronic components on the trip unit printed wire board, an additional internal wall isolates the printed wire board from the remainder of the circuit breaker interior. A novel operating handle was described having means for preventing egress of the gaseous by-products of arc interruption through the handle operator access slot. A novel radial clearance groove, formed at the junction of the operating handle post and the operating handle flange, allows the operating handle to move between fully "ON" and "OFF" positions within a handle slot which is insufficient in size to accommodate movement of a handle operator of standard thickness. Also described were colored indicia positioned outboard the operating handle flange to indicate the open, tripped and closed position of the circuit breaker contacts.

Having thus described our invention, what we claim as new and desire to secure by Letters Patent is:

1. A molded case circuit breaker comprising:

a plastic case and a plastic cover;

a pair of contacts within said case;

a trip unit and operating mechanism within said case responding to overcurrent conditions through an electric circuit to separate said contacts and interrupt said electric circuit; and an operating handle comprising a post extending through a slot in said cover and joined to a central flange member contained within said case, said post including a transverse groove formed therein and aligned with one edge of said slot, to thereby allow travel of said central flange member within said case.

2. The molded case circuit breaker of claim 1 including a pair of outer flanges, one on either side of said central flange, said outer flanges having color-coded indicia indicating the operating condition of said contacts.

3. The molded case circuit breaker of claim 2 including an indicating window on each side of said slot arranged over said outer flanges on said cover to provide visual access to said color-coded indicia.

4. The molded case circuit breaker of claim 2 including an elongated recess formed within each of said outer flanges, said color-indicating indicia being located within said recess.

5. The molded case circuit breaker of claim 1 wherein said trip unit comprises an integrated circuit chip mounted on a printed wire board.

6. The molded case circuit breaker of claim 5 including a wall integrally-formed within said case intermediate said printed wire board and said operating mechanism to thereby segregate said printed wire board from said operating mechanism.

7. An operating handle for a molded case circuit breaker comprising:

a one piece integrally-formed plastic handle operator including a post upwardly extending from a central flange;

a pair of outer flanges integrally-formed on either side of said central flange and an elongated recess formed within a top surface of each of said outer flanges; and color-coded indicia applied within said elongated recess for providing indication of the operating condition of a pair of circuit breaker contacts arranged within a molded case circuit breaker having a circuit breaker handle access slot formed through a circuit breaker cover.

8. The operating handle of claim 7 including a transverse groove formed within said post and arranged for receiving an edge of said circuit breaker handle access slot.

* * * * *